US007788358B2

(12) United States Patent
Martino (10) Patent No.: US 7,788,358 B2
(45) Date of Patent: Aug. 31, 2010

(54) USING CROSS-SITE RELATIONSHIPS TO GENERATE RECOMMENDATIONS

(75) Inventor: Paul J. Martino, Mountain View, CA (US)

(73) Assignee: Aggregate Knowledge, Mountain View, CA (US)

( * ) Notice: Subject to any disclaimer, the term of this patent is extended or adjusted under 35 U.S.C. 154(b) by 989 days.

(21) Appl. No.: 11/369,562

(22) Filed: Mar. 6, 2006

(65) Prior Publication Data

US 2007/0208729 A1    Sep. 6, 2007

(51) Int. Cl.
*G06F 15/173* (2006.01)

(52) U.S. Cl. ................ 709/223; 709/224; 709/225; 709/226; 709/227; 709/200; 709/217; 709/232; 370/468; 370/252; 370/455; 705/26; 705/7; 705/14

(58) Field of Classification Search ......... 709/223–227, 709/200–203, 217, 232; 705/26–27, 7–10, 705/14; 370/468, 252, 455
See application file for complete search history.

(56) References Cited

U.S. PATENT DOCUMENTS

| | | | |
|---|---|---|---|
| 4,258,386 A | 3/1981 | Cheung | |
| 4,546,382 A | 10/1985 | McKenna et al. | |
| 4,833,308 A | 5/1989 | Humble | |
| 4,930,011 A | 5/1990 | Kiewit | |
| 4,972,504 A | 11/1990 | Daniel, Jr. et al. | |
| 5,019,961 A | 5/1991 | Addesso et al. | |
| 5,099,319 A | 3/1992 | Esch et al. | |
| 5,117,349 A | 5/1992 | Tirfing et al. | |
| 5,128,752 A | 7/1992 | Von Kohorn | |
| 5,155,591 A | 10/1992 | Wachob | |
| 5,201,010 A | 4/1993 | Deaton et al. | |
| 5,223,924 A | 6/1993 | Strubbe | |
| 5,227,874 A | 7/1993 | Von Kohorn | |
| 5,231,494 A | 7/1993 | Wachob | |
| 5,237,620 A | 8/1993 | Deaton et al. | |
| 5,249,262 A | 9/1993 | Baule | |

(Continued)

OTHER PUBLICATIONS

Linden, G. et al., "Amazon.com Recommendations: Item-to-Item Collaborative, Filtering," IEEE Internet Computing, IEEE, Jan.-Feb. 2003, pp. 76-80.

(Continued)

*Primary Examiner*—Wing F Chan
*Assistant Examiner*—Benjamin M Thieu
(74) *Attorney, Agent, or Firm*—Blakely, Sokoloff, Taylor & Zafman LLP (57) ABSTRACT

A relationship server tracks end-user interactions across multiple web sites and generates recommendations. The web sites observe relationships established by end-user interactions. If end-users provide the same personally identifiable information to multiple web sites, the sites generate the same unique identifier for those end-users. The web sites send messages to the relationship server that reference the end-users using the identifiers and describe the relationships observed for the end-users. The relationship server receives messages from multiple web sites and canonicalizes them to produce an efficient representation of the relationships. Upon receiving a message requesting a recommendation based on an item, the relationship server performs collaborative filtering using the relationship data to identify a list of items to recommend. The relationship server sends the recommendations to the requesting entity and the recommendations are presented to the end-user.

25 Claims, 8 Drawing Sheets

U.S. PATENT DOCUMENTS

| | | |
|---|---|---|
| 5,285,278 A | 2/1994 | Holman |
| 5,305,196 A | 4/1994 | Deaton |
| 5,315,093 A | 5/1994 | Stewart |
| 5,327,508 A | 7/1994 | Deaton et al. |
| 5,331,544 A | 7/1994 | Lu et al. |
| 5,351,075 A | 9/1994 | Herz et al. |
| 5,388,165 A | 2/1995 | Deaton et al. |
| 5,410,344 A | 4/1995 | Graves et al. |
| 5,430,644 A | 7/1995 | Deaton et al. |
| 5,446,919 A | 8/1995 | Wilkins |
| 5,448,471 A | 9/1995 | Deaton et al. |
| 5,471,610 A | 11/1995 | Kawaguchi et al. |
| 5,515,098 A | 5/1996 | Carles |
| 5,537,586 A | 7/1996 | Amram et al. |
| 5,544,049 A | 8/1996 | Henderson et al. |
| 5,559,549 A | 9/1996 | Hendricks et al. |
| 5,563,998 A | 10/1996 | Yaksich et al. |
| 5,563,999 A | 10/1996 | Yaksich et al. |
| 5,592,560 A | 1/1997 | Deaton et al. |
| 5,604,542 A | 2/1997 | Dedrick |
| 5,608,447 A | 3/1997 | Farry et al. |
| 5,619,709 A | 4/1997 | Caid et al. |
| 5,621,812 A | 4/1997 | Deaton et al. |
| 5,632,007 A | 5/1997 | Freeman |
| 5,636,346 A | 6/1997 | Saxe |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,186 A | 7/1997 | Ferguson |
| 5,659,469 A | 8/1997 | Deaton et al. |
| 5,661,516 A | 8/1997 | Carles |
| 5,675,662 A | 10/1997 | Deaton et al. |
| 5,687,322 A | 11/1997 | Deaton et al. |
| 5,704,017 A | 12/1997 | Heckerman |
| 5,724,521 A | 3/1998 | Dedrick |
| 5,740,549 A | 4/1998 | Reilly et al. |
| 5,749,081 A | 5/1998 | Whiteis |
| 5,754,938 A | 5/1998 | Herz et al. |
| 5,754,939 A | 5/1998 | Herz et al. |
| 5,758,257 A | 5/1998 | Herz et al. |
| 5,758,259 A | 5/1998 | Lawler |
| 5,761,601 A | 6/1998 | Nemirofsky et al. |
| 5,761,662 A | 6/1998 | Dasan |
| 5,774,170 A | 6/1998 | Hite et al. |
| 5,774,868 A | 6/1998 | Cragun et al. |
| 5,786,845 A | 7/1998 | Tsuria |
| 5,794,210 A | 8/1998 | Goldhaber et al. |
| 5,796,952 A | 8/1998 | Davis et al. |
| 5,805,974 A | 9/1998 | Hite |
| 5,832,457 A | 11/1998 | O'Brien et al. |
| 5,835,087 A | 11/1998 | Herz et al. |
| 5,848,396 A | 12/1998 | Gerace |
| 5,867,799 A | 2/1999 | Lang et al. |
| 5,918,014 A | 6/1999 | Robinson |
| 5,926,205 A | 7/1999 | Krause |
| 5,930,764 A | 7/1999 | Melchione |
| 5,933,811 A | 8/1999 | Angles |
| 5,948,061 A | 9/1999 | Merriman et al. |
| 5,970,469 A | 10/1999 | Scroggie et al. |
| 5,974,396 A | 10/1999 | Anderson et al. |
| 5,974,399 A | 10/1999 | Giuliani et al. |
| 5,977,964 A | 11/1999 | Williams et al. |
| 5,978,799 A | 11/1999 | Hirsch |
| 5,991,735 A | 11/1999 | Gerace |
| 6,002,393 A | 12/1999 | Hite et al. |
| 6,005,597 A | 12/1999 | Barrett et al. |
| 6,009,409 A | 12/1999 | Adler |
| 6,009,410 A | 12/1999 | LeMole |
| 6,012,051 A | 1/2000 | Sammon, Jr. |
| 6,014,634 A | 1/2000 | Scroggie et al. |
| 6,020,883 A | 2/2000 | Herz et al. |
| 6,026,370 A | 2/2000 | Jermyn |
| 6,029,195 A | 2/2000 | Herz |
| 6,035,280 A | 3/2000 | Christensen |
| 6,038,591 A | 3/2000 | Wolfe |
| 6,055,573 A | 4/2000 | Gardenswartz |
| 6,064,980 A | 5/2000 | Jacobi et al. |
| 6,084,628 A | 7/2000 | Sawyer |
| 6,088,722 A | 7/2000 | Herz et al. |
| 6,092,049 A | 7/2000 | Chislenko et al. |
| 6,119,098 A | 9/2000 | Guyot et al. |
| 6,134,532 A | 10/2000 | Lazarus et al. |
| 6,160,570 A | 12/2000 | Sitnik |
| 6,160,989 A | 12/2000 | Hendricks et al. |
| 6,177,931 B1 | 1/2001 | Alexander et al. |
| 6,185,541 B1 | 2/2001 | Scroggie et al. |
| 6,216,129 B1 | 4/2001 | Eldering |
| 6,236,978 B1 | 5/2001 | Tuzhilin |
| 6,266,649 B1 * | 7/2001 | Linden et al. ............... 705/26 |
| 6,285,999 B1 | 9/2001 | Page |
| 6,298,348 B1 | 10/2001 | Eldering |
| 6,317,722 B1 | 11/2001 | Jacobi et al. |
| 6,321,221 B1 | 11/2001 | Bieganski |
| 6,327,574 B1 | 12/2001 | Kramer et al. |
| 6,412,012 B1 | 6/2002 | Bieganski et al. |
| 6,438,579 B1 * | 8/2002 | Hosken ................. 709/203 |
| 6,457,010 B1 | 9/2002 | Eldering et al. |
| 6,560,578 B2 | 5/2003 | Eldering |
| 6,571,279 B1 | 5/2003 | Herz et al. |
| 6,592,612 B1 | 7/2003 | Samson et al. |
| 6,643,696 B2 | 11/2003 | Davis |
| 6,820,062 B1 | 11/2004 | Gupta et al. |
| 6,871,186 B1 | 3/2005 | Tuzhilin et al. |
| 7,062,510 B1 | 6/2006 | Eldering |
| 7,069,272 B2 | 6/2006 | Snyder |
| 7,080,070 B1 | 7/2006 | Gavarini |
| 7,216,123 B2 | 5/2007 | Kamvar et al. |
| 2001/0014868 A1 | 8/2001 | Herz et al. |
| 2001/0021914 A1 * | 9/2001 | Jacobi et al. ............. 705/8 |
| 2002/0010625 A1 * | 1/2002 | Smith et al. ............. 705/14 |
| 2002/0095676 A1 | 7/2002 | Knee |
| 2002/0099812 A1 | 7/2002 | Davis |
| 2002/0143916 A1 | 10/2002 | Mendiola et al. |
| 2002/0194058 A1 | 12/2002 | Eldering |
| 2003/0037041 A1 | 2/2003 | Hertz |
| 2003/0088872 A1 | 5/2003 | Maissel et al. |
| 2003/0154442 A1 | 8/2003 | Papierniak |
| 2004/0088300 A1 | 5/2004 | Avery et al. |
| 2005/0071251 A1 * | 3/2005 | Linden et al. ............ 705/26 |
| 2006/0200556 A1 | 9/2006 | Brave et al. |

OTHER PUBLICATIONS

Sarwar, B. et al., "Item-Based Collaborative Filtering Recommendation Algorithms," WWW10, May 1-5, 2001, pp. 1-15.

International Search Report for International Patent Application No. PCT/US 07/05901, mailed Mar. 11, 2008, 2 pages.

Written Opinion of the International Searching Authority for International Patent Application No. PCT/US 07/05901, mailed Mar. 11, 2008, 4 pages.

Beeferman, Doug, et al., "Agglomerative Clustering of a Search Engine Query Log", 1-9.

Billsus, Daniel, et al., "Learning Collaborative Information Filters", 1-9.

Bittner, M., et al., "Molecular Classification of Cutaneous Malignant Melanoma by Gene Expression Profiling", (Aug. 2000), 536-538.

Boutilier, Craig, et al., "Active Collaborative Filtering", 1-18.

Brin, Sergey, et al., "Dynamic Itemset Counting and Implication Rules for Market Basket Data", 1-10.

Broder, Andrei Z., et al., "Min-Wise Independent Permutations", (2000), 630-659.

Butte, A. J., et al., "Mutual Information Relevance Networks: Functional Genomic Clustering Using Pairwise Entropy Measurements", 1-24.

Charikar, Moses S., et al., "Similarity Estimation Techniques from Rounding Algorithms", (May 2002), 1-9.

Chen, Kay-Yut, et al., "Eliminating Public Knowledge Biases in Information-Aggregation Mechanisms", ISSN 0025-1909, (Jul. 2004), 983-994.

Claypool, Mark, et al., "Combining Content-Based and Collaborative Filters in an Online Newspaper", 1-16.

Cosley, Dan, et al., "An open framework for practical testing of recommender systems using ResearchIndex", (2002), 1-12.

Craswell, Nick, et al., "An Experimental Comparison of Click Position-Bias Models", (Feb. 2008), 1-8.

Das, Abhinandan, et al., "Google News Personalization: Scalable Online Collaborative Filtering", (May 2007), 271-281.

Dhillon, Inderjit S., et al., "Information-Theoretic Co-clustering", 1-10.

Fraley, Chris, et al., "MCLUST Version 3: An R Package for Normal Mixture Modeling and Model-Based Clustering", (Sep. 2006), 1-45.

Gunduz, Sule, et al., "A Web Page Prediction Model Based on Click-Stream Tree Representation of User Behavior", (2003), 1-6.

Herlocker, Jonathan L., et al., "Evaluating Collaborative Filtering Recommender Systems", (Jan. 2004), 5-53.

Heymann, Paul, et al., "Can Social Bookmarking Improve Web Search?", (Feb. 2008), 1-10.

Joachims, Thorsten, "Evaluating Search Engines using Clickthrough Data", (Feb. 2002), 1-13.

Keerthi, S. S., "Support Vector Machines", 1-8.

Kwok-Wai, Cheung, et al., "Mining Customer Product Ratings for Personalized Marketing", 1-21.

Lawrence, R. D., et al., "Personalization of Supermarket Product Recommendations", (Jul. 2000), 1-28.

Linden, Greg, et al., "Amazon.com Recommendations", (Feb. 2003), 76-80.

Madani, Omid, et al., "Contextual Recommender Problems", (Aug. 2005), 86-89.

Madani, Omid, et al., "Using (Graphical) Probabilistic Generative Models for Recommendation", 1-22.

Mehta, Bhaskar, et al., "Robust Collaborative Filtering", 1-35.

Mulpuru, Sucharita, "Which Personalization Tools Work for eCommerce-And Why", (Dec. 2007), 1-22.

Paulson, Patrick, et al., "Combining Collaborative and Content-Based Filtering Using Conceptual Graphs", 1-15.

Pazzani, Michael J., "A Framework for Collaborative, Content-Based and Demographic Filtering", 1-16.

Pennock, David M., et al., "Collaborative Filtering by Personality Diagnosis: A Hybrid Memory- and Model-Based Approach", (2000), 473-480.

Radlinski, Filip, et al., "Active Exploration for Learning Rankings from Clickthrough Data", (Aug. 2007), 1-10.

Sarwar, Badrul, et al., "Analysis of Recommendation Algorithms for E-Commerce", 1-8.

Sarwar, Badrul, et al., "Item-based Collaborative Filtering Recommendation Algorithms", 1-15.

Sarwar, Badrul M., et al., "Recommender Systems for Large-scale E-Commerce: Scalable Neighborhood Formation Using Clustering", 1-6.

Schein, Andrew I., et al., "Methods and Metrics for Cold-Start Recommendations", (Aug. 2002), 1-9.

Silverstein, Craig, et al., "Beyond Market Baskets: Generalizing Association Rules to Dependence Rules", 1-30.

Singhal, Amit, et al., "Pivoted Document Length Normalization", 1-9.

Tintarev, Nava, "Explanations of Recommendations", (Oct. 2007), 203-206.

Ungar, Lyle H., et al., "Clustering Methods for Collaborative Filtering", 1-11.

Van Der Weide, TH.P., et al., "Individual and Collective Approaches for Searcher Satisfaction in IR", (Jul. 15, 1998), 1-12.

Van Der Weide, TH.P., et al., "Measuring the Incremental Information Value of Documents", 1-26.

Vogt, Christopher C., "Passive Feedback Collection-An Attempt to Debunk the Myth of Clickthroughs", 1-9.

Watts, Duncan J., et al., "Collective Dynamics of 'Small World' Networks", (Jun. 4, 1998), 1-3.

Wei, Yan Z., et al., "Learning Users' Interests by Quality Classification in Market-Based Recommender Systems", (Mar. 2005), 1-27.

Wietsma, Rene T., et al., "Product Reviews in Mobile Decision Aid Systems", 1-4.

Yip, Andy M., et al., "The Generalized Topological Overlap Matrix for Detecting Modules in Gene Networks", 1-7.

* cited by examiner

USING CROSS-SITE RELATIONSHIPS TO GENERATE RECOMMENDATIONS

BACKGROUND OF THE INVENTION

1. Field of the Invention

This invention pertains in general to determining recommendations through collaborative filtering and related techniques and in particular to identifying relationships used to determine the recommendations by tracking interactions across multiple web sites.

2. Description of the Related Art

Many commercial web sites desire "stickiness." That is, the sites want people browsing the sites to stay on the sites for a long time. For example, a media site that generates revenue through advertising wants a person to view many articles and other content, so that the site will have more opportunities to present advertisements. Likewise, a retail site that sells merchandise wants a person to stay on the site longer in order to increase the number of the person's purchases.

One way to increase stickiness is by observing a person's behaviors and presenting the person with a list of suggestions that might be of interest. If a person reads a news story about a particular subject, the site presents a list of other stories that he might also want to read. Similarly, if the person buys a particular item, the site presents a list of related items she might also wish to purchase. For example, if the person browses the web page of a camera on the site, the site will present her with a list of suggested accessories, such as memory cards, carrying cases, etc.

Web sites use collaborative filtering techniques to detect relationships and generate suggestions. Generally speaking, collaborative filtering is based on a collection of relationships obtained by monitoring the behaviors of people. When a person expresses a relationship by, e.g., browsing a web page for a certain type of camera or reading a news story on a certain topic, collaborative filtering analyzes the collection to identify people who expressed the same relationship, and then calculates a set of recommendations based on the other relationships expressed by the identified people. Thus, if many people who browse a web page for a camera also browse a web page for a certain memory card, the web page for that card can be presented as a suggestion to a person who initially browses the camera page.

The recommendations produced through collaborative filtering improve as the amount of relationships in the collection increases. Likewise, the recommendations improve as more is known about the person for whom the recommendations is being made. Since improved recommendations lead to improved stickiness and other desirable effects, web site operators would like to perform collaborative filtering based on the broadest possible set of relationship data.

However, most web sites that perform collaborative filtering base their recommendations on only a limited set of relationship data. There is no convenient way for a site to track a person's interactions (and expressed relationships) across other web sites. Accordingly, a site must base its recommendations on only the behaviors it directly observes. Therefore, less is known about the person for whom the recommendations are made, and the pool of relationship data on which the collaborative filtering is based is also smaller. The recommendations are of lower quality as a result.

Moreover, the relationship data used for collaborative filtering are not heterogeneous in type. The relationship data may associate different types of news stories, or different consumer goods, but the data do not associate completely heterogeneous items, such as consumer goods and news-groups, news stories and images, or people and events. This deficiency leads to homogenous recommendations that may be of less value to web sites.

As a result, there is a need in the art for a way of gathering relationship data and producing recommendations that does not suffer from the problems described above.

BRIEF SUMMARY OF THE INVENTION

The above need is met by using a relationship server to track end-user interactions across multiple web sites and generate recommendations based on these interactions. Web sites observe end-user interactions with the web sites and detect relationships established through these interactions. In some cases, the end-users provide the web sites with personally identifiable information. The web sites use this information to create unique identifiers for the end-users. If the end-users provide the same information to multiple sites, the sites will create and use the same identifiers for the same end-users.

The web sites send messages to the relationship server that reference the end-users using the identifiers and describe the relationships observed for them. In addition, the web sites send messages that establish relationships between arbitrary items of arbitrary types. The relationship server canonicalizes the relationships described by the messages to produce an efficient representation. Upon receiving a message requesting a recommendation for an end-user from a web site, the relationship server performs collaborative filtering using the relationship data in the efficient representation to identify a list of items of arbitrary types to recommend. The relationship server sends the recommendations to the requesting web site and the site presents the recommendations to the end-user. An aggregation module executing on a client used by an end-user or elsewhere on the Internet can also interact with the relationship server to establish relationships and provide recommendations.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
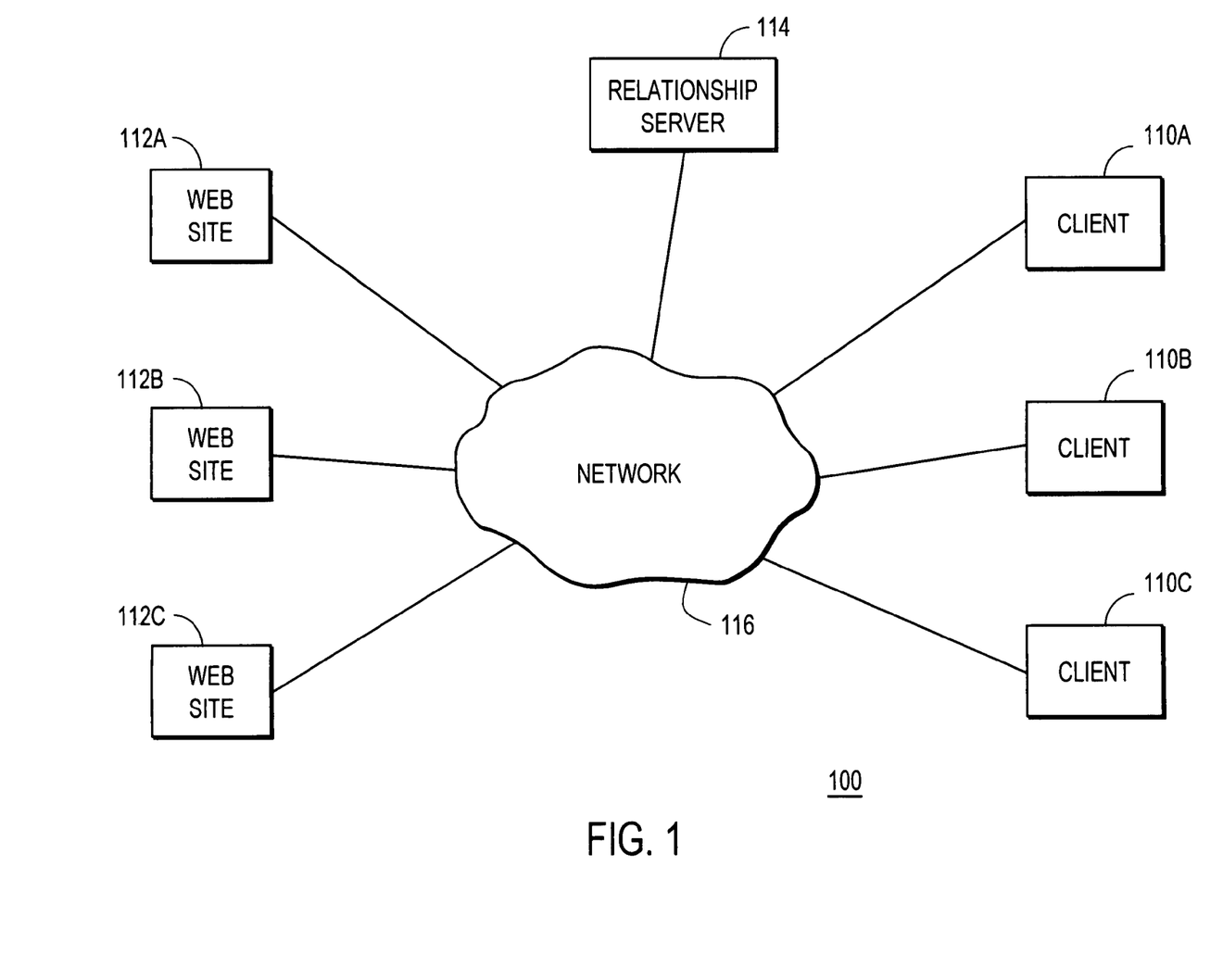
FIG. 1 is a high-level block diagram of a computing environment according to one embodiment of the present invention.

FIG. 1 is a high-level block diagram of a computing environment 100 according to one embodiment of the present invention. FIG. 1 illustrates three client computers 110A, 110B, 110C, three web sites 112A, 112B, 112C, and a relationship server 114 connected by a network 116. At the highest level, end-users of the clients 110 interact with the web sites 112 to establish relationships. The web sites 112 and/or the clients 110 themselves describe these relationships to the relationship server 114. The relationship server 114 uses collaborative filtering and/or other techniques to process the relationships and generate recommendations. The web sites 112 and/or clients 110 present these recommendations to the end-users.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," "110B," and/or "110C" in the figures).

The client 110 in this embodiment represents a computer that is used by an end-user to interact with the web sites 112 and/or relationship server 114 via the network 116. The client 110 can be, for example, a personal computer or another network-capable device, such as a personal digital assistant (PDA), a cellular telephone, a pager, a video game system, a television "set-top box" etc. Although FIG. 1 illustrates only three clients 110, embodiments of the present invention can have thousands or millions of clients participating in the environment 100 described herein. Three clients 110 are illustrated in order to simplify and clarify the present description.

The web sites 112 are locations on the network 116 that provide web pages to the clients 110 via the network 116. The web sites 112 can be, for example, media sites that primarily provide content such as news to the end-users, retailer sites that enable the end-users to purchase items, social networking sites that enable end-users to interact with other people, and hybrid sites that provide a mix of these features. Those of skill in the art will recognize that there are essentially an unlimited number of different types of web sites 112 with which the clients 110 can interact. Although FIG. 1 illustrates only three web sites 112, embodiments of the present invention can have many web sites. Only three websites 112 are illustrated in order to simplify and clarify the present description. The web sites 112 need not be related or associated with each other.

The end-users of the clients 110 interact with the web sites 112 to establish relationships. For example, assume an end-user views a web page for a digital camera, and then views a web page for a memory card for that camera. These actions create relationships between the end-user and the camera, and between the end-user and the memory card. The web sites 112 observe relationships such as these, and provide messages to the relationship server 114 describing them.

In addition, the web sites 112 receive recommendations from the relationship server 114. These recommendations are provided to the end-users, typically by including the recommendations on web pages served to the end-users' clients 110. The recommendations can be for arbitrary and/or heterogeneous items and the web sites can request that the relationship server 114 provide recommendations for only specified types of items. For example, the recommendations can include items an end-user might want to purchase, news stories the end-user might want to read, bands the end-user might like, discussion groups in which the end-user might want to participate, etc.

The relationship server 114 receives descriptions of relationships from the web sites 112 and/or clients 110 and provides recommendations in return. In one embodiment, the relationship server 114 performs collaborative filtering on the received relationships to generate the recommendations. Since the relationships are from multiple web sites 112 and/or clients 110, they form a large pool of data on which the recommendations are based. Moreover, in some embodiments the relationships created by end-users are tracked across multiple web sites 112, meaning that the recommendations are based on a larger set of relationships established by that end-user. Therefore, the recommendations generally have more breadth than they would if based on less information, such as relationships generated by only a single web site.

For example, if an end-user views a web page related to a camera on a first web site 112, the web site send a message to the relationship server 114 describing the relationship between the end-user and the camera. If the end-user then views a web page related to a memory card on a second web site, the second web site sends a message to the relationship server 114 describing the relationship between the end-user and the memory card. The relationship server 114 derives a relationship between the camera and memory card. When other web sites ask for recommendations associated with the camera, the relationship server 114 returns a set of recommendations including the memory card. In one embodiment, the relationship server 114 generates the recommendations in real time, and the recommendations can include items of arbitrary and/or heterogeneous types. Although only one relationship server 114 is shown, embodiments of the environment 100 can have multiple relationship servers.

The network 116 represents the communication pathways between the clients 110, web sites 112, and relationship server 114. In one embodiment, the network 116 is the Internet. The network 116 can also utilize dedicated or private communications links that are not necessarily part of the Internet. In one embodiment, the network 116 uses standard communications technologies and/or protocols. Thus, the network 116 can include links using technologies such as 802.11, integrated services digital network (ISDN), digital subscriber line (DSL), asynchronous transfer mode (ATM), etc. Similarly, the networking protocols used on the network 116 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), the web services description language (WSDL), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
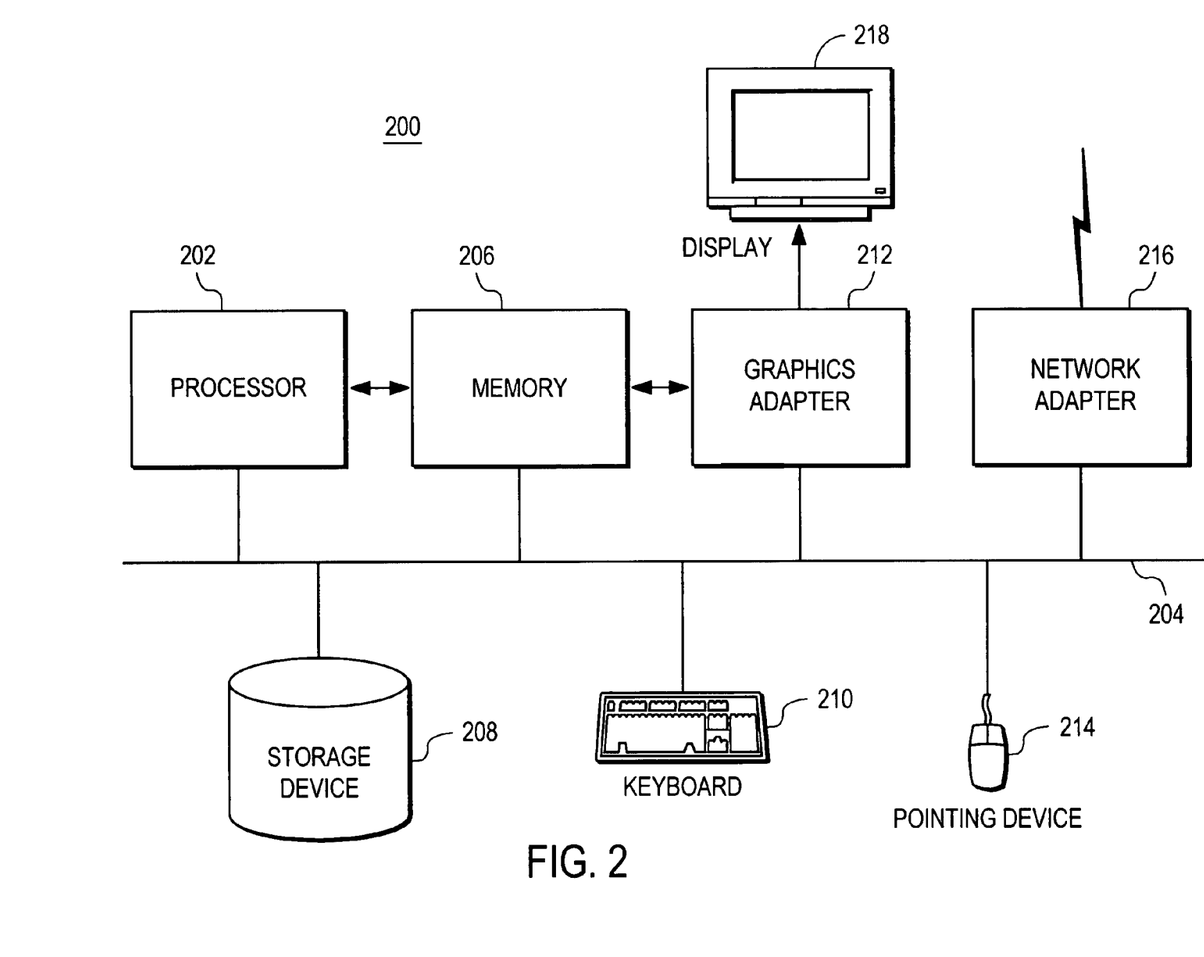
FIG. 2 is a high-level block diagram illustrating a functional view of a typical computer for use as one of the entities illustrated in the environment of FIG. 1 according to one embodiment.

FIG. 2 is a high-level block diagram illustrating a functional view of a typical computer 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power required for the entity. For example, the client 110 typically requires less processing power than the web site 112 and relationship server 114. Thus, the client 110 can be a personal computer, cellular telephone, etc. The web site 112 and relationship server 114 computers, in contrast, may comprise more powerful processors and/or multiple computers working together to provide the functionality described herein. In addition, the computers 200 can lack some of the features shown in FIG. 2. For example, a blade server supporting a web site 112 may lack a keyboard, pointing device, and display. In one embodiment, the computer 200 serving as the relationship server 114 utilizes a processor 202 and/or memory 206 having a 64-bit word size.

Figure 3A:
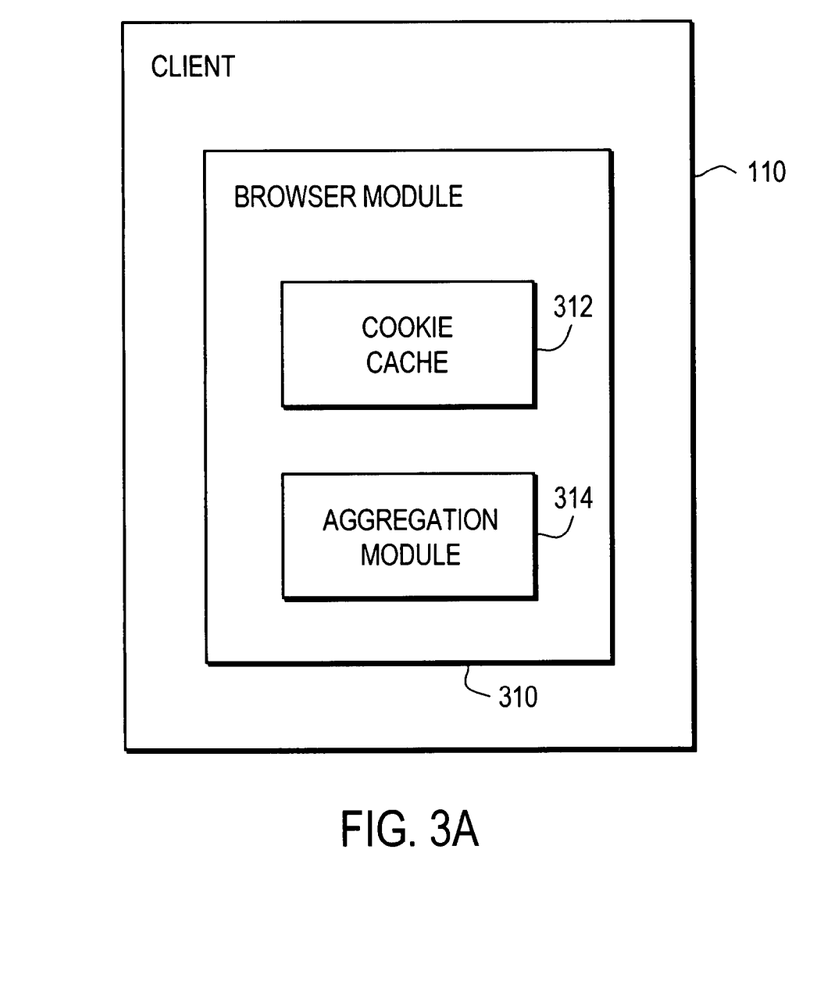
FIGS. 3A and 3B are high-level block diagrams illustrating an aggregation module according to two embodiments.

FIG. 3A is a high-level block diagram illustrating an aggregation module 314 within a client 110 according to one embodiment. Those of skill in the art will recognize that other embodiments can have different and/or other modules than the ones described here, and that the functionalities can be distributed among the modules in a different manner.

As shown in FIG. 3A, the client 110 includes a browser module 310 that allows the end-user to view web pages and/or other data provided by the web sites 112 and/or relationship server 114. In one embodiment, the browser module 310 is a conventional web browser, such as MICROSOFT INTERNET EXPLORER or MOZILLA FIREFOX. The browser module 310 maintains a cookie cache 312 that stores cookies received from web sites 112 on the network 116. A web site 112 can communicate with the browser module 310 and instruct it to create a cookie in the cookie cache 312 holding certain information. The browser module 310 provides the cookie when the browser connects to the site that created it.

In the embodiment of FIG. 3A, the browser module 310 includes an aggregation module 314 that aggregates information about the end-user of the client 110. The aggregation module 314 can be a plug-in that integrates into the browser module 310 and/or a standalone application. In one embodiment, the aggregation module 314 is absent.

In one embodiment, the end-user provides information about herself to the aggregation module 314. This information can include demographic and/or psychographic information, email addresses, credit card numbers, privacy preferences and the like. For example, in one embodiment the aggregation module 314 includes a field in which the end-user can provide all of her email addresses. In some embodiments, the aggregation module 314 generates information about the end-user by tracking the end-user's interactions with the browser module 310 and web sites 112. The aggregation module 314 derives relationships from the information in its purview and provides these relationships to the relationship server 114. For example, the information collected by the aggregation module 314 can indicate that the end-user uses different login information and/or email addresses at different web sites, and the corresponding relationships can indicate that these logins correspond to the same person. Similarly, the relationships can link the end-user to various web sites 112 that she frequents, to describe items that she purchases, to news articles that she reads, etc.

The aggregation module 314 requests and receives recommendations for items from the relationship server 114. Generally, the recommendations identify items that might interest the end-user. For example, the aggregation module 314 can request and receive recommendations based on a web site that the end-user frequently visits. The aggregation module 314 presents the recommendations to the end-user by including them on a web page displayed by the browser module 310 or through similar techniques. In one embodiment, the aggregation module 314 uses the recommendations to create a highly-personalized page for the end-user that displays items in which the end-user might be interested. The browser module 310 can be configured to display this page as the home page that the browser shows when initially activated.

Figure 3B:
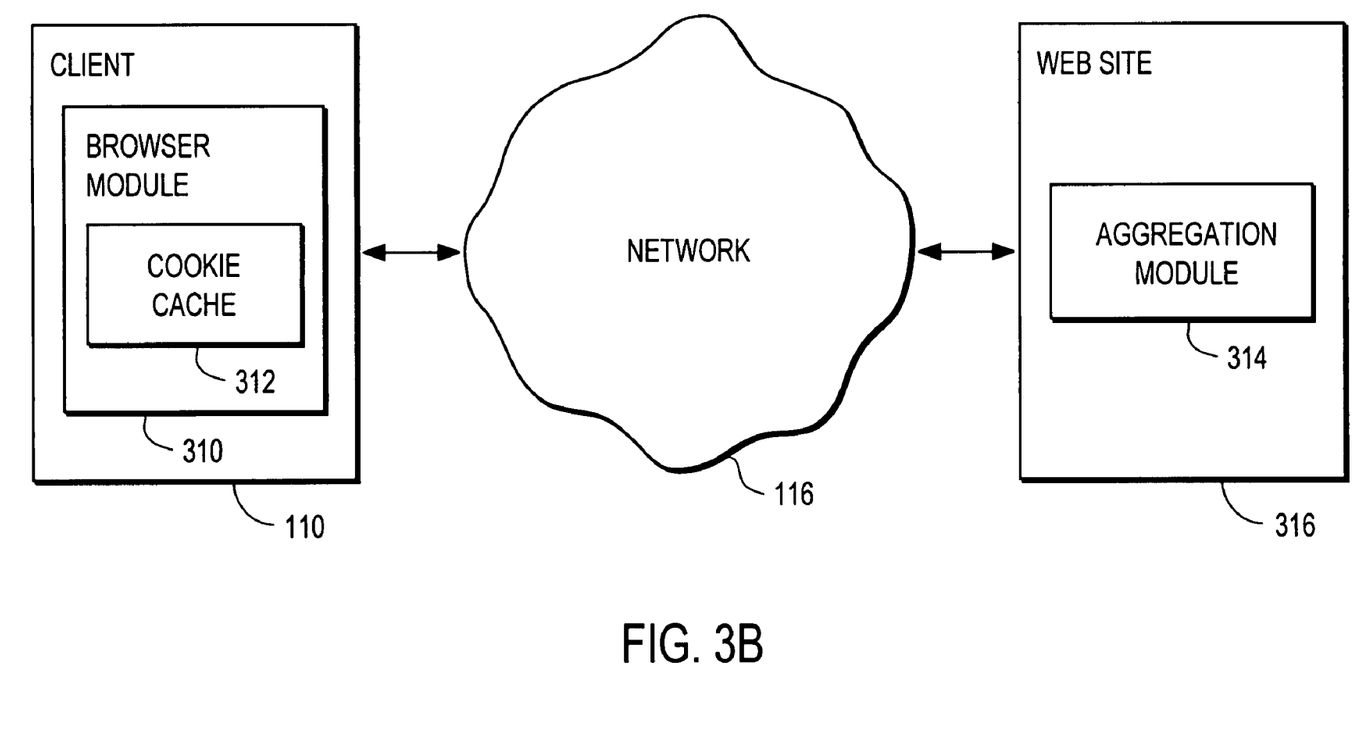

FIG. 3B illustrates an alternative embodiment where the aggregation module 314 is located at a web site 316 remote from the client 110. As in FIG. 3A, the client 110 includes a browser module 310 having a cookie cache 312. In the embodiment of FIG. 3B, the browser module 310 interacts with a web site 316 via the network 116. Depending upon the embodiment, the web site 316 can be located on the relationship server 114, on a special purpose web site for providing the functionality of the aggregation module 314, or on a general purpose web site like those illustrated in FIG. 1 that provides other content and functionality in addition to the aggregation module.

In this embodiment, the remote aggregation module 314 supports concurrent interactions with multiple end-users using different clients 110 and provides the same general functionality as the local aggregation module illustrated in FIG. 3A on an application service provider (ASP) basis. For example, the browser module 310 can be configured to contact the remote aggregation module 314 upon start up and provide it with an identifier of the end-user. In response, the aggregation module 314 interacts with the relationship server 114 to obtain a set of recommended items for the end-user. The aggregation module 314 creates a web page containing these recommendations and provides it to the browser module 310 for display as the home page. In other embodiments, the functionality of the aggregation module 314 is provided by multiple modules on both the client 110 and web site 316.

In one embodiment, the end-user uses his local browser module 310 to select links or other items displayed on the page created and provided by the remote aggregation module 314. The links on the page are coded to notify the remote aggregation module 314 of end-user's action before the selected page is displayed. The remote aggregation module 314 uses these notifications to track the end-user's activities and create relationships between the end-user and the items he accesses. For example, the remote aggregation module 314 provides the end-user with a web page that contains links to a first web site that displays sports scores and to a second web site that displays celebrity gossip. If the end-user selects these links and visits both of these web sites, the aggregation module 314 creates relationships between the end-user and these two sites. Thus, the remote aggregation module 314 can create relationships between end-users and web sites even if the sites themselves do not interact with the relationship server 114.

Figure 4:
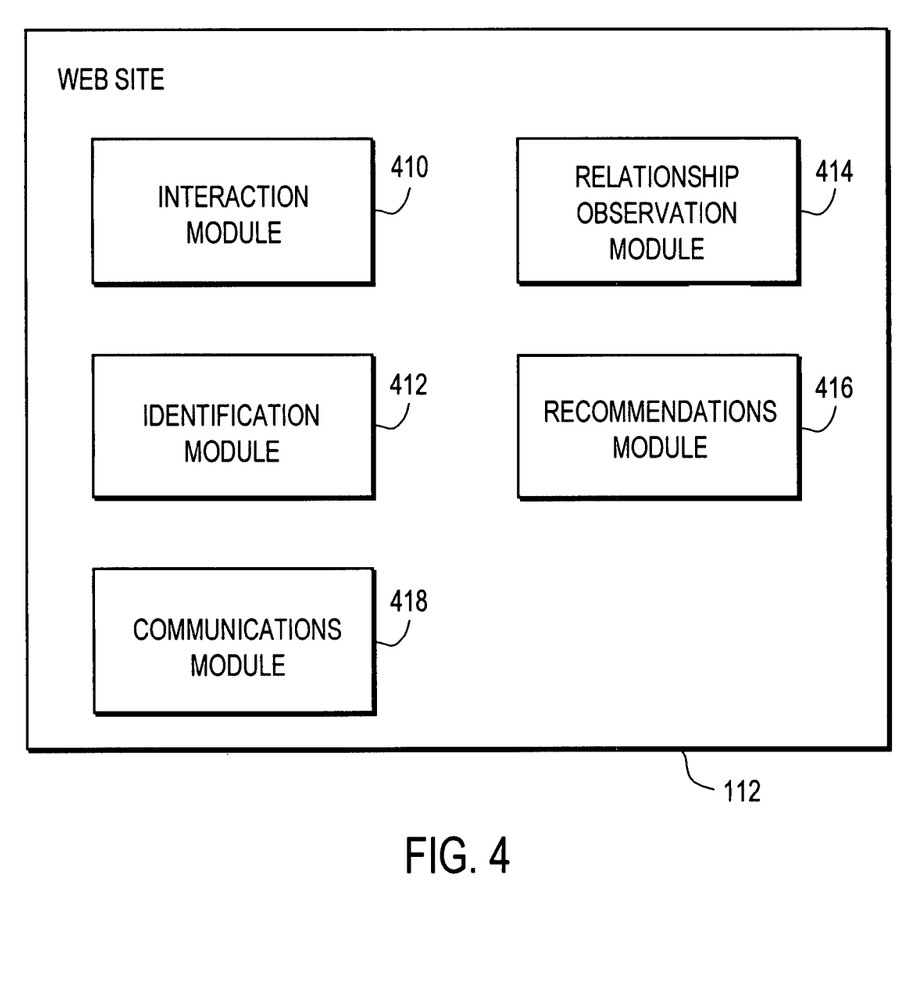
FIG. 4 is a high-level block diagram illustrating modules within a web site according to one embodiment.

FIG. 4 is a high-level block diagram illustrating modules within a web site 112 according to one embodiment. Those of skill in the art will recognize that other embodiments can have different and/or other modules than the ones described here, and that the functionalities can be distributed among the modules in a different manner.

The web site 112 includes an interaction module 410 for interacting with the clients 110. In one embodiment, the interaction module 410 includes a web server serving web pages and other information to the clients 110. The web pages allow the end-users of the clients 110 to interact with the web site 112 and perform functions such as reading news stories, purchasing items, exchanging messages with other end-users, etc. The web pages are typically encoded in a markup language such as HTML and may include text, images, and/or multimedia content. In addition, the web pages may be static or dynamic and can include program code such as JAVA or JAVASCRIPT.

An identification module 412 identifies the end-users that are interacting with the web site 112 and associates interactions from the same end-user. In some embodiments, a web site 112 permits anonymous usage, meaning that the site does not receive any personally identifiable information about the end-users. In such embodiments, the identification module 412 uses cookies to distinguish the end-users that are interacting with it. The identification module 412 causes the browser module 310 at the end-user's client 110 to store a cookie in its cookie cache 312 containing a unique and arbitrary value. The browser module 310 provides the cookie to the web site 112 each time the browser interacts with the site, and the identification module 412 uses the unique value in the cookie to identify the end-user and to recognize interactions performed by the same end-user.

In some embodiments, the web site 112 requires and/or enables an end-user to provide some form of personally identifiable information when interacting with the site. For example, the web site 112 can require that an end-user provide security credentials such as a login/password pair, a valid email address, and/or a name, etc. before using the site. In another example, the web site 112 can receive the end-user's personally identifiable information from a third party account management service such as PASSPORT from MICROSOFT CORP. An embodiment of the identification module 412 generates an identifier based on the personally identifiable information and stores a cookie containing this identifier at the end-user's client 110. The identification module 412 uses the identifier to recognize interactions performed by the end-user that provided the personally identifiable information. Moreover, in one embodiment different web sites 112 generate the end-user identifiers using the same technique (i.e., the web sites will generate the same identifier based on the same personally identifiable information). Thus, the identifier can be used to track and correlate end-user activities across multiple web sites 112.

In one embodiment, the end-user and/or third party service provides an email address to the web site 112. The identification module 412 uses the Friend of a Friend (FOAF) resource description framework to generate the unique identifier of the end-user from the email address. Under this framework, an end-user is identified by the hash of his email address, e.g., the hash produced by shalsum ("mailto:<email_address>"), where <email_address> is the address provided by the end-user.

A relationship observation module 414 observes relationships between items and reports the relationships to the relationship server 114. In one embodiment, the module 414 bases the relationships on observed end-user interactions with the web site 112. For example, if the relationship observation module 414 observes that the end-user requests a web page for a digital camera and a web page for a memory card, the module generates relationships between the end-user and camera, and between the end-user and memory card. As mentioned above, the relationships can be between heterogeneous types of items. Thus, the relationship observation module 414 can generate relationships between, say, discussion groups and images, music and news stories, people and items, etc. In addition, the relationship observation module 414 can generate relationships between arbitrary tags (e.g., text strings) and items. For example, the module 414 can generate a relationship between the text string "Texas" and the "Longhorns" discussion group.

Further, the relationship observation module 414 can report a relationship when it recognizes that two seemingly different identifiers in fact refer to the same item. Such recognition can occur when a previously-anonymous end-user provides personally identifiable information to the web site 112. Assume that the end-user does not initially provide an email address. As a result, the identification module 412 uses a cookie with an arbitrary value to identify the end-user, and the relationship observation module 414 generates relationships associating the end-user's actions with the identifier contained in the cookie. Now, assume that the end-user supplies an email address and the identification module 412 creates a new cookie having a value based on the email address to identify the end-user. The relationship observation module 414 recognizes the relationship between the end-user identified by the email address (i.e., the FOAF hash of the email address) and the end-user identified by the arbitrary value and creates a relationship between these two identifiers. All of the interactions performed by the previously-anonymous end-user are now related to the interactions performed by the now-identified end-user.

In some embodiments, at least some of the relationships produced by the observation module 414 are established through a manual process. For example, a content editor at the web site 112 can create an initial set of relationships and supply them to the relationship observation module 414. This manual creation can be used to overcome the start up problem inherent in collaborative filtering, where the initial set of relationships is nonexistent or too small to generate meaningful recommendations. In addition, the content editor can manually add tags to content at the site 112 in order to enhance the recommendation process. For example, the content editor can add a common tag to all news article related to a particular subject, thereby making it more likely that related news stores will be returned in response to a request for recommendations.

A recommendations module 416 presents recommendations to the end-users. The recommendations are received from the relationship server 114 and are generated in response to relationships established by multiple end-users and observed by one or more web sites 112. As described above, the recommendations can include items an end-user might want to purchase, news stories the end-user might want to read, bands the end-user might like, discussion groups in which the end-user might want to participate, etc. In one embodiment, the recommendations are presented on web pages served by the interaction module 410.

In some embodiments, the recommendations received from the relationship server 114 are pre-formatted for inclusion on a web page served by the interaction module 410. For example, the set of items can be encapsulated in an HTML or XML object that can be directly incorporated into the web page. The object is designed to give a particular layout and appearance to the recommended items, such as to distinguish the items from other content on the page and/or indicate that the items came from the relationship server 114. In other embodiments, the recommendations are received from the relationship server 114 as an unformatted list of items. In these latter embodiments, the recommendations module 416 generates the layout and appearance for the recommendations. The recommendations may be presented in delineated areas of the web pages and/or integrated into the other content provided on the pages.

A communications module 418 communicates with the relationship server 114. In one embodiment, the communications module 418 provides the relationship server 114 with messages describing the relationships observed by the relationship observation module 414. In addition, the communications module 418 sends messages requesting recommendations to the relationship server 114 and receives messages in response describing recommendations that can be presented to end-users by the recommendations module 416. In one embodiment, the communications module 418 uses web services to communicate with the relationship server 114 and may utilize the functionality of the interaction module 410 for its communications. Other embodiments use other communications protocols to generate and/or exchange messages, such as client-side JAVASCRIPT.

In one embodiment, a message describing a relationship sent from the web site's communication module 416 to the relationship server 114 includes a four-tuple as follows:

(first_label, first_predicate)->(second_label, second_predicate).

In this message, the first label acts as a unique identifier of an item. The first predicate describes the meaning of the first label and can represent the type of item and/or indicate that the label has special meaning. The second label and predicate share the same meanings of their counterparts, but describe the item to which the first item is related.

For example, consider the following message:

(user_identifier, person)->("www.groups.com/127", group).

In this message, "user_identifier" is a unique identifier of the end-user for whom the relationship was observed. In one embodiment, this identifier is either the arbitrary value (for an anonymous user) or the FOAF hash of the end-user's email address. "Person" is a predicate stating that the item identified by "user_identifier" is a person. The string "www.groups.com/127" uniquely identifies an item, and the predicate "group" states that the identified item is a discussion group. Thus, this message describes a relationship between an end-user and a discussion group. In this example, the discussion group is identified by its universal resource identifier (URI). Other types of items can be identified using other techniques. Another example of a message is:

("Title", book)->("image", image), which describes a relationship between the book having the title "Title" and the image identified by the name "image."

In one embodiment, a message can include a special "tag" predicate that describes a relationship between an arbitrary string and an item. Consider the message:

("Texas", tag)->("longhorns.com/16", group)

This message associates the arbitrary tag "Texas" with the discussion group identified by the URI "longhorns.com/16."

In addition, a message can include a special "self" predicate that indicates that two different identifiers in fact refer to the same underlying item. For example, the message:

("identifier1", person)->("identifier2", self), indicates that the person identified by the label "identifier1" is the same as the item identified by the label "identifier2." The "self" predicate is thus useful when the relationship observation module 414 and/or aggregation module 314 observes that one item is referenced by two or more identifiers. For example, in one embodiment an aggregation module 314 that receives multiple email addresses from an end-user sends messages using the "self" predicate to indicate that the email addresses are associated.

In some embodiments, a message describing a relationship sent from the web site's communication module 416 to the relationship server 114 includes an additional tuple specifying an intent. An "intent" describes the action that established the relationship. In one embodiment, the default intent is "viewed" and this intent is assumed to be present if no other intent is specified. Thus, the four-tuple ("identifier," person)->("memory card," item) is equivalent to the five-tuple ("identifier," person)->("memory card," item)->(viewed) and states that a person viewed a web page for a memory card. Other intents include "bought," "sold," "added," and "removed." In one embodiment, there is a limited set of possible intent types. In another embodiment, the intent types are arbitrary and unlimited.

The communications module 416 receives recommendations from the relationship server 114 by identifying an item to the server and requesting a set of related items. For example, in one embodiment the communications module 416 sends a message specifying a (label, predicate) tuple to the relationship server 114 and receives in return a list of (label, predicate) tuples that are related to the item identified by the tuple in the request message. The returned items can be of arbitrary types (i.e., can have arbitrary predicates). Moreover, the communications module 416 can specify constraints on the types of items and/or intents returned as recommendations. For example, the module 416 can specify that only images should be returned, or that only purchased items should be returned. Thus, a request for related items can specify the equivalent of: "for this book, show me tickets that have been purchased."

The functionality of the aggregation module 314 is similar to the functionality of the web sites, at least with respect to identifying end-users, observing relationships, presenting recommendations, and communicating with the relationship server 114. In some embodiments, the aggregation module 314 includes logical equivalents of the modules illustrated in FIG. 4. Likewise, the aggregation module 314 can communicate with the relationship server 114 by exchanging messages of the types described above.

Figure 5:
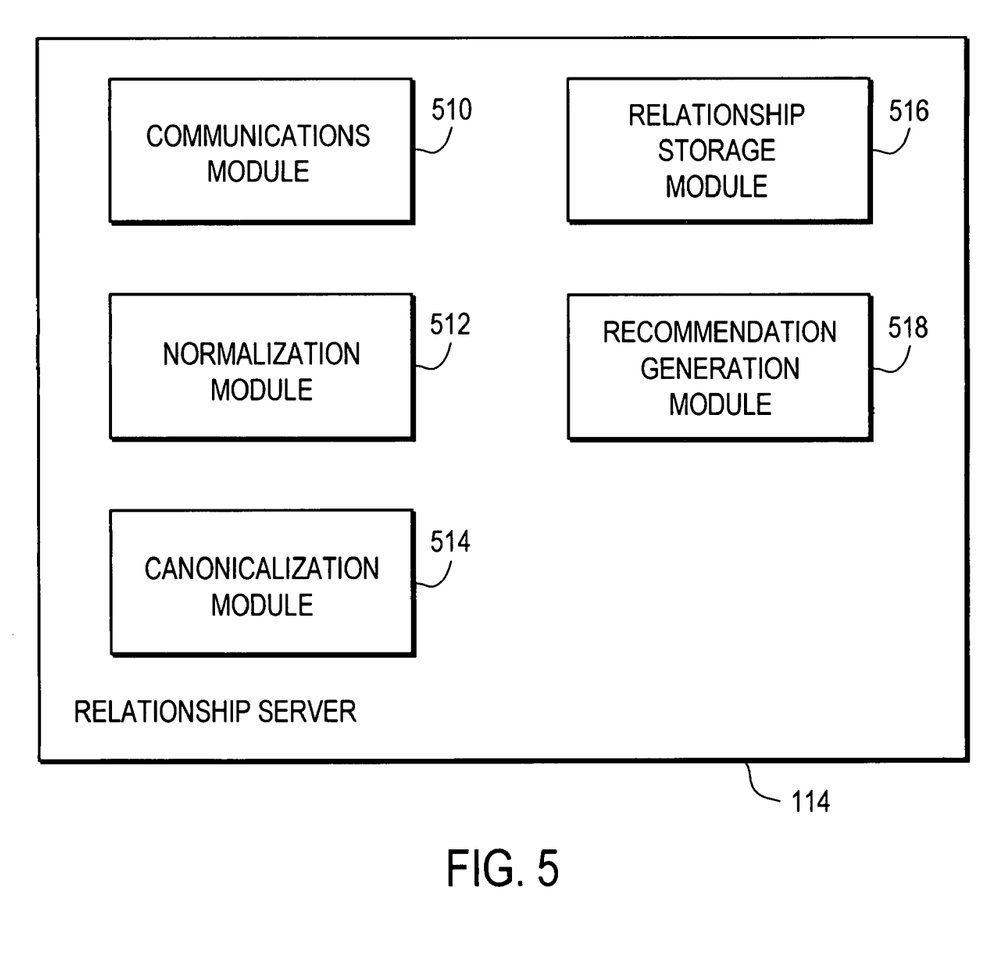
FIG. 5 is a high-level block diagram illustrating modules within the relationship server according to one embodiment.

FIG. 5 is a high-level block diagram illustrating modules within the relationship server 114 according to one embodiment. Those of skill in the art will recognize that other embodiments can have different and/or other modules than the ones described here, and that the functionalities can be distributed among the modules and/or entities illustrated in FIG. 1 in a different manner.

A communications module 510 communicates with the various web sites 112; clients 110, and/or remote aggregation modules 314 on the network 116. In one embodiment, the communications module 510 includes a web server that supports web services and allows the relationship server 114 to receive messages describing relationships and/or requesting recommendations and provide messages containing recommendations in response.

A normalization module 512 normalizes the messages received from the web sites 112 and/or clients 110. In one embodiment, the normalization module 512 analyzes predicates within the messages and verifies that the labels associated within the predicates are in expected formats. If a label is not in the expected format, the normalization module 512 alters the label to place it in the correct format or rejects the message. The normalization module 512 modifies labels by adding or removing details such as protocol specifiers (e.g., "http://"), file name extensions (e.g., ".JPEG"), and the like. The normalization process thus ensures that like items are consistently identified even if different web sites 112, clients 110, and/or remote aggregation modules 314 use slightly different labels for them.

A canonicalization module 514 canonicalizes the normalized messages from the web sites 112 and/or clients 110. In one embodiment, the canonicalization module 514 associates labels, predicates, and intents with unique fixed-width integer values. In one embodiment, each unique label is associated with a unique 32-bit value. Each unique predicate is typically represented using fewer that 32 bits because most embodiments have only a limited number of predicates. Similarly, each unique intent is represented using only a few bits because there are only a limited number of possible intent types in one embodiment. In addition, the canonicalization module 514 maintains a table that associates the labels, predicates, and intents with their corresponding integers. Canonicalization thus allows each relationships to be stored in a fixed amount of memory.

In one embodiment, the canonicalization module 514 receives normalized messages from the normalization module 512 and extracts the labels, predicates and optional intents. The module 514 determines whether the labels, predicates, and intents have been encountered before and, if so, determines the integers that are associated with them. If a label, predicate or intent has not been encountered before, the canonicalization module 514 generates an arbitrary and unique integer value and associates the label, predicate, or intent with it. In one embodiment, the integer is generated by incrementing the previously-generated integer.

In addition, an embodiment of the canonicalization module 514 reverses the canonicalization process when providing recommendations or in other situations where it is necessary and/or desired. In one embodiment, the relationship server 114 generates recommendations internally using the canonicalized representations of the relationships. The canonicalization module 514 maps the canonicalized representations back to their non-canonicalized meanings so that the recommendations can be sent out of the relationship server 114.

A relationship storage module 516 stores the canonicalized relationships. Further, in one embodiment the storage module 516 stores the canonicalization table associating labels, predicates, and intents with their corresponding integer values. In one embodiment, the relationship storage module 516 stores these data in a relational database, such as a MySQL database.

The relationship storage module 516 also stores the data describing the relationships in a RAM or other relatively fast memory. In one embodiment, a canonicalized two-tuple, and an optional intent, are stored in a single 64-bit memory word. The relationship storage module 516 stores a relationship (i.e., a four-tuple and optional intent) as a linked set of 64-bit words. This is an efficient representation of the relationships and allows for fast manipulation of the relationship data by the computer acting as the relationship server 114.

A recommendation generation module 518 generates recommendations for the web sites 112 and/or clients 110 based on the relationships stored by the relationship storage module 516. In one embodiment, the recommendation generation module 518 uses collaborative filtering and operates in real-time on the relationship data stored in the RAM or other fast memory. Real-time collaborative filtering allows for filtering based on arbitrary labels, predicates, intents, and/or relationships. Thus, given a (label, predicate) tuple, the recommendation generation module 518 generates a set of related (label, predicate) tuples that can be presented as recommendations. If necessary or desired, the related tuples can be limited to only certain types (e.g., tuples containing only certain predicates or intents). In one embodiment, the collaborative filtering itself is performed using conventional techniques.

The collaborative filtering is performed using relationships supplied by multiple web sites 112 and/or clients 110, and the resulting recommendations are of high quality. Moreover, since the activities of the end-users that provide personally identifiable information are tracked across multiple web sites 112, the pool of relationships on which the collaborative filtering is based is deeper than if only single-site activities were tracked.

Figure 6:
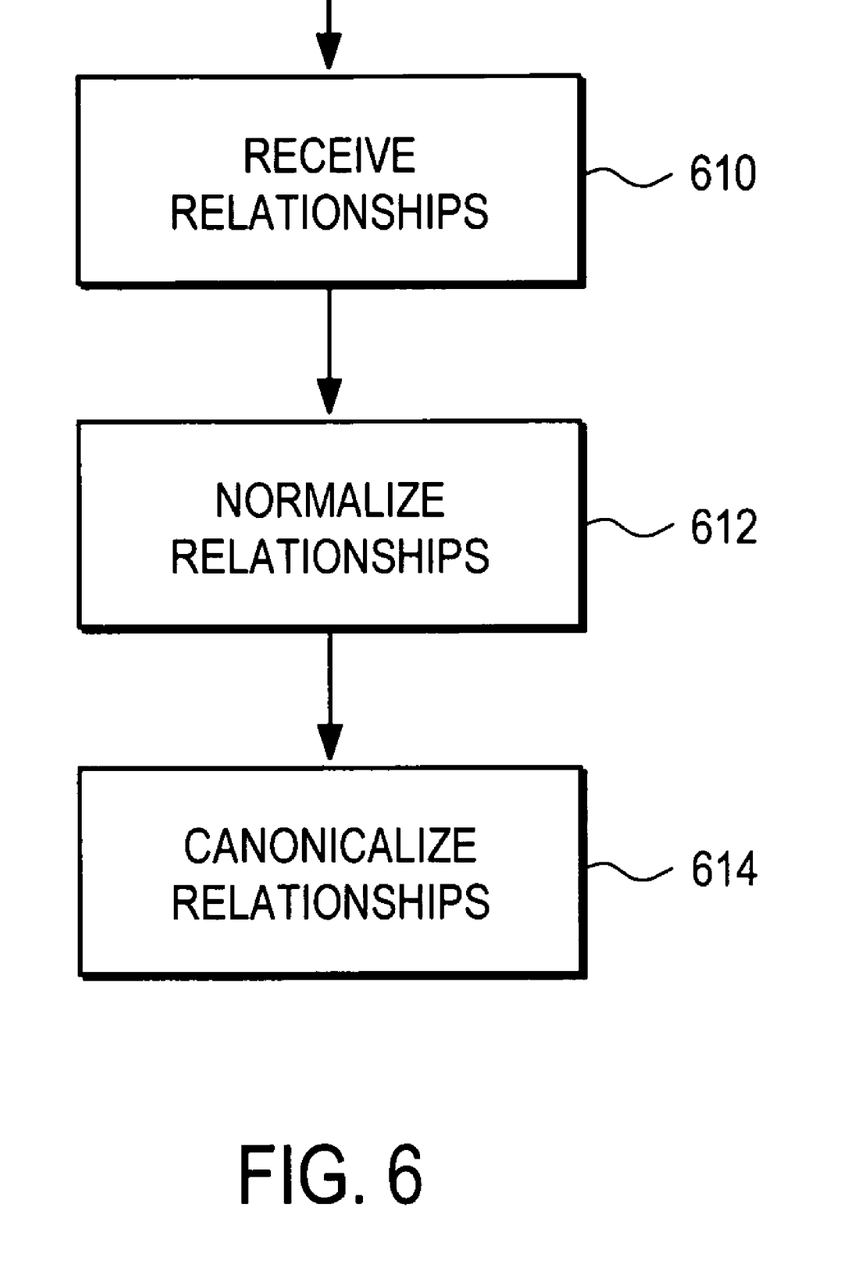
FIG. 6 is a flow chart illustrating steps performed by the relationship server upon receiving descriptions of relationships according to one embodiment.

FIG. 6 is a flow chart illustrating steps performed by the relationship server 114 upon receiving descriptions of relationships according to one embodiment. Other embodiments perform the steps in different orders and/or perform different or additional steps than the ones shown in FIG. 6. In one embodiment, the relationship server 114 concurrently receives relationships from multiple web servers 112 and clients 110. As a result, the relationship server 114 can perform multiple instances of the steps of FIG. 6 concurrently and/or perform steps in parallel.

The relationship server 114 receives 610 relationships from the web sites 112 and/or aggregation modules 314. These relationships are often generated through end-user interactions with web sites but can also be hand-coded by end-users and/or operators of the web sites. In one embodiment, the relationships are described as four-tuples having the (label_1, predicate_1)->(label_2, predicate_2) format described above. In some instances, the relationship will describe an end-user by including an identifier for the user as one of the labels and using the "person" predicate indicating that the label identifies a person. In one embodiment, the identifier of the end-user is a hash of the end-user's email address and multiple web sites use the same identifier to reference the same end-user.

The relationship server 114 normalizes 612 the received messages. In one embodiment, the relationship server 114 verifies that the labels predicates, and intents in the relationship messages are in expected formats. If the messages are not in the expected format, an embodiment of the relationship server 114 modifies the messages to place them in the correct format. Normalization thus ensures that messages from different web sites 112 and/or clients 110 are in the same format.

The relationship server 114 next canonicalizes 614 the relationship messages. In one embodiment, canonicalization associates the label, predicate, and optional intent with integer values so that each (label, predicate, intent) tuple fits into a single data word. This efficient representation allows the relationship server 114 to store all of the received relationships in a fast memory.

Figure 7:
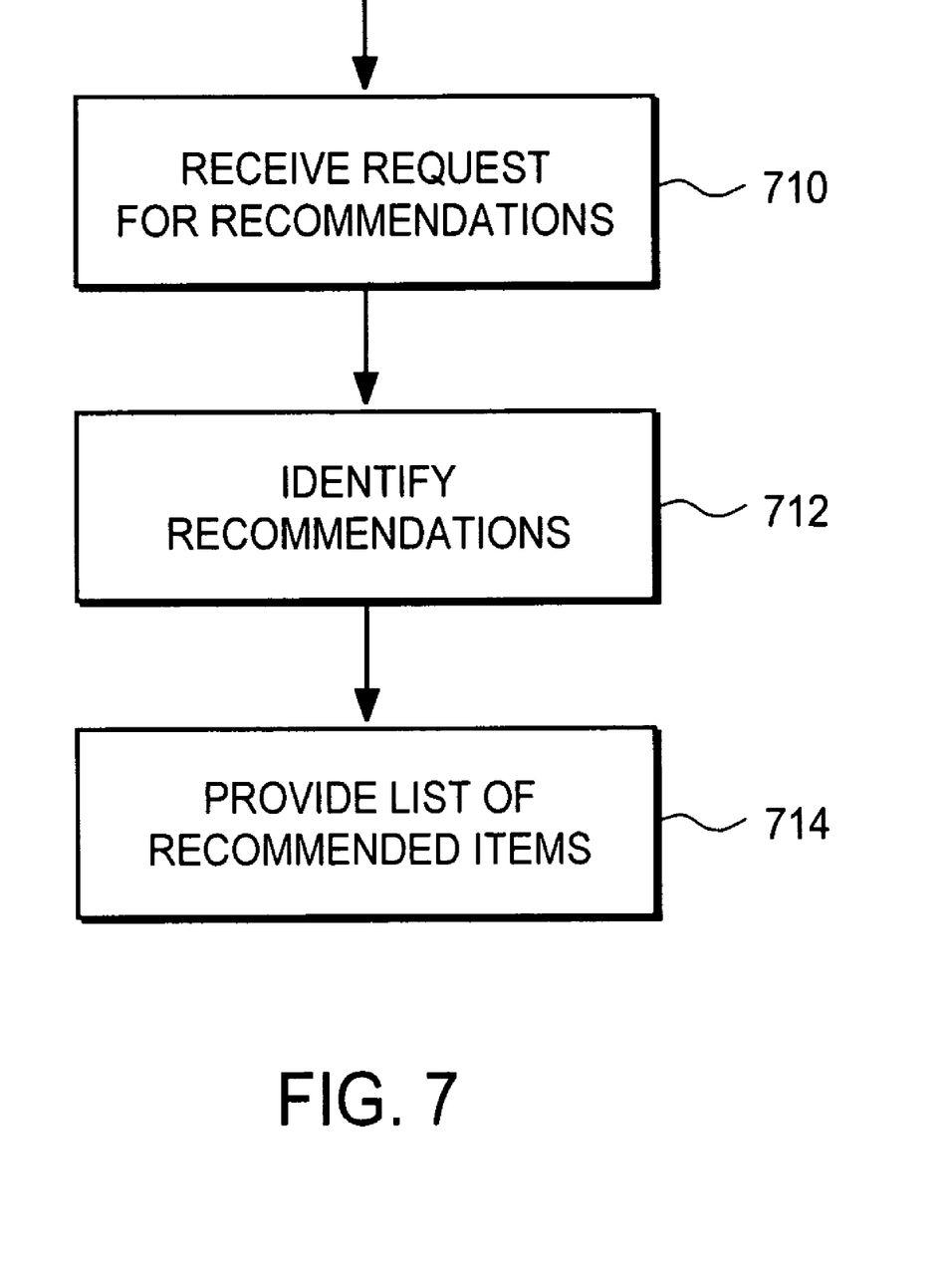
FIG. 7 is a flow chart illustrating steps performed by the relationship server upon receiving a request for recommendations according to one embodiment.

FIG. 7 is a flow chart illustrating steps performed by the relationship server 114 upon receiving a request for recommendations according to one embodiment. Other embodiments perform the steps in different orders and/or perform different or additional steps than the ones shown in FIG. 7. The relationship server 114 can perform multiple instances of the steps of FIG. 7 concurrently and/or perform steps in parallel.

The relationship server 114 receives 710 a request for a set of recommendations, typically from a web site 112 or aggregation module 314. The recommendation request includes a (label, predicate) tuple and may specify constraints on the recommendations, such as a total number of recommended items to return and/or a set of predicates or intents for the recommended items.

In response to the request, the relationship server 114 identifies 712 a set of items to recommend. In one embodiment, the relationship server 114 performs collaborative filtering on the item identified in the request to identify a set of items that might be of interest and satisfy any constraints specified in the request. The collaborative filtering is performed in real time on the relationship data stored in the fast memory. The relationship server 114 provides 714 the set of recommended items to the requesting web site 112 and/or aggregation module 314. As part of this process, an embodiment converts the (label, predicate) tuples of the recommended items from their canonicalized representations back to their normalized representations. The web site 112 and/or aggregation module 314 displays the recommendations on a web page or other data provided to an end-user.

An embodiment of the relationship server 114 thus receives relationship data from multiple clients 110, remote aggregation modules 314, and/or web sites 112. In addition, the relationship server 114 provides a way to track end-user relationships across multiple web sites. The relationship server 114 uses the relationship information to produce high-quality recommendations.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A system for generating recommendations, comprising: a processor to execute modules, including:
 a communications module to receive a message requesting recommendations via a network, the message specifying a label identifying an item, a predicate describing a type of the item and at least one constraint on one or more items to be returned as recommendations;
 a canonicalization module to generate canonicalized representations of relationships by associating each component of the relationship data with a unique identifier (ID), the relationship data including a label component identifying an item, a predicate describing a type of the item and an intent describing an action that established the relationship;
 a relationship storage module for storing the canonicalized representations in a memory; and
 a recommendation generation module for generating recommendations based on the canonicalized representations of the relationships stored in the memory by performing collaborative filtering to identify a set of items related to the items identified in the message requesting recommendations and satisfying the at least one constraint.

2. The system of claim 1, further comprising:
 a normalization module for normalizing the messages describing relationships received from the plurality of computers.

3. The system of claim 1, wherein the canonicalization module generates the canonicalized representations of the messages optimized for efficient storage in the memory.

4. The system of claim 3, wherein the canonicalization module substitutes integer values for the item and predicate to form the canonicalized representation.

5. The system of claim 3, wherein generates a canonicalized representation of the item and predicate that fits into a single memory word of a computer.

6. The system of claim 1, wherein the recommendation generation module performs collaborative filtering using the canonicalized representations of the relationships to generate the recommendations.

7. A system for providing recommendations of items to an end-user comprising:
 a processor to execute modules, including:
 a relationship observation module for observing relationships established by the end-user through interactions with a web site;
 a communications module for sending messages having relationship data describing the observed relationships to a relationship server via a computer network and to receive a message requesting recommendations for the end-user based at least in part on observed relationships described by messages sent by a plurality of web sites, the message specifying a label identifying an item, a predicate describing a type of the item and at least one constraint on one or more items to be returned as recommendations; and
 a recommendations module to perform collaborative filtering to identify a set of items related to the items identified in the message requesting recommendations and satisfying the at least one constraint.

8. The system of claim 7, further comprising:
 an interaction module for providing web pages via the computer network to a client utilized by the end-user to enable the end-user to interact with the web site.

9. The system of claim 7, further comprising:
 an identification module for identifying the end-user and associating the end-user's interactions.

10. The system of claim 9, wherein the identification module stores a cookie containing a value identifying the end-user at a client used by the end-user to access the web site.

11. The system of claim 10, wherein the value contained by the cookie is derived from personally identifiable information provided by the end-user, the plurality of web sites use the value to identify the end-user, and the value is included with messages describing observed relationships sent to the relationship server.

12. The system of claim 7, wherein the communications module sends a message describing a relationship that includes a first label identifying a first item, a first predicate describing a type of the first item, a second label identifying a second item, and a second predicate describing a type of the second item, and wherein the message indicates that the first and second items are related.

13. The system of claim 12, wherein the message describing the relationship indicates that the first and second labels identify a same item.

14. The system of claim 7, wherein the communications module sends a message describing a relationship that includes an intent describing an action that established the relationship.

15. The system of claim 7, wherein the communications module sends a message requesting recommendations to the relationship server via the computer network, the message requesting recommendations including a label identifying an item and a predicate describing a type of the item, and wherein the recommendations received from the relationship server are based at least in part on the label and predicate.

16. A computer generated method of providing recommendations, comprising:
- receiving a message requesting recommendations, the message specifying a label identifying an item, a predicate describing a type of the item and at least one constraint on one or more items to be returned as recommendations;
- establishing a set of relationships by associating each component of relationship data with a unique identifier (ID), the relationship data including a label component identifying an item, a predicate describing a type of the item and an intent describing an action that established the relationship;
- generating recommendations of items by performing collaborative filtering to identify a set of items related to the items identified in the message requesting recommendations and satisfying the at least one constraint; and
- providing the recommendations to the an end-user.

17. The computer generated method of claim 16, further comprising tracking end-user interactions across a plurality of unrelated web sites by:
- receiving personally identifiable information from the end-user;
- generating a unique identifier for the end-user responsive to the personally identifiable information, wherein the plurality of unrelated web sites generate the same unique identifier responsive to the same personally identifiable information; and
- associating the unique identifier with the end-user interactions.

18. A computer program product having a non-transitory computer-readable medium having computer program instructions embodied therein for providing recommendations of items to an end-user, comprising:
- a communications module for sending messages having relationship data describing the observed relationships to a relationship server via a computer network and to receive a message requesting recommendations for the end-user based at least in part on observed relationships described by messages sent by a plurality of web sites, the message specifying a label identifying an item, a predicate describing a type of the item and at least one constraint on one or more items to be returned as recommendations; and
- a recommendations module to perform collaborative filtering to identify a set of items related to the items identified in the message requesting recommendations and satisfying the at least one constraint.

19. The computer program product of claim 18, further comprising: a relationship observation module for observing relationships established by the end-user through interactions with the web site.

20. The computer program product of claim 18, wherein the recommendations module is further adapted to provide recommendations to a plurality of end-users of a plurality of remote clients via the computer network.

21. The computer program product of claim 18, further comprising:
- an interaction module for providing web pages via the computer network to a client utilized by the end-user to enable the end-user to interact with the web site.

22. The computer program product of claim 18, further comprising:
- an identification module for identifying the end-user and associating the end-user's interactions.

23. The computer program product of claim 22, wherein the identification module stores a cookie containing a value identifying the end-user at a client used by the end-user to access the web site.

24. The computer program product of claim 23, wherein the value contained by the cookie is derived from personally identifiable information provided by the end-user, the plurality of web sites use the value to identify the end-user, and the value is included with messages describing observed relationships sent to the relationship server.

25. The computer program product of claim 18, wherein the communications module is adapted to send a message requesting recommendations to the relationship server via the computer network, the message requesting recommendations including a label identifying an item and a predicate describing a type of the item, and wherein the recommendations received from the relationship server are based at least in part on the label and predicate.

* * * * *